United States Patent
Mouna-Kingue et al.

(10) Patent No.: US 7,299,043 B2
(45) Date of Patent: Nov. 20, 2007

(54) DETECTION OF INVALID CHANNEL REQUESTS

(75) Inventors: Michel S. Mouna-Kingue, Worcester Park (GB); Sathiaseelan Sundaralingam, Camberley (GB); Khairul Hasan, Camberley (GB); Eric Jones, Cowplain Hants (GB); Mikko Säily, Espoo (FI); Santosh Nath, West Bengal (IN)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/196,310

(22) Filed: Aug. 4, 2005

(65) Prior Publication Data

US 2007/0010247 A1    Jan. 11, 2007

(30) Foreign Application Priority Data

Jul. 5, 2005    (FI)    .................................. 20055389

(51) Int. Cl.
*H04Q 7/20*    (2006.01)
(52) U.S. Cl. .................... 455/434; 455/452.1; 455/62; 455/405; 455/450
(58) Field of Classification Search ................ 455/450, 455/73, 436, 452.1, 434, 452, 405; 370/278
See application file for complete search history.

(56) References Cited

U.S. PATENT DOCUMENTS

| | | | |
|---|---|---|---|
| 5,396,648 A | | 3/1995 | Patsiokas et al. |
| 5,923,761 A | * | 7/1999 | Lodenius ...................... 455/73 |
| 6,011,970 A | * | 1/2000 | McCarthy ................... 455/436 |
| 6,185,435 B1 | | 2/2001 | Imura |
| 2004/0062211 A1 | * | 4/2004 | Uhlik .......................... 370/278 |
| 2004/0142696 A1 | * | 7/2004 | Saunders et al. ........... 455/450 |
| 2004/0229625 A1 | * | 11/2004 | Laroia et al. ............... 455/450 |
| 2005/0003824 A1 | * | 1/2005 | Siris ........................ 455/452.1 |

FOREIGN PATENT DOCUMENTS

| | | |
|---|---|---|
| EP | 1161113 | 12/2001 |
| GB | 2321576 | 7/1998 |
| WO | WO 02089512 | 11/2002 |

* cited by examiner

*Primary Examiner*—Joseph Feild
*Assistant Examiner*—Michael T. Vu
(74) *Attorney, Agent, or Firm*—Squire Sanders & Dempsey L.L.P.

(57) ABSTRACT

A data transmission method comprises receiving a channel access request to a radio receiving unit from a mobile station of the telecommunication system, and performing an operation on the channel access request using a predefined configuration of devices and algorithms of the radio receiving unit. After filtering the background noise from the channel access request; a characteristic of the channel access request against at least one predefined detection rule, and the channel access request is considered valid if the characteristic of the channel access request fulfils the detection rule. Essentially, the detection rule is not dependent on the configuration of the radio receiving unit.

14 Claims, 3 Drawing Sheets

DETECTION OF INVALID CHANNEL REQUESTS

FIELD

The invention relates to mobile communications, and especially to improved detection of invalid channel access requests in a data transmission method, a network element, a detection unit, a telecommunication system, a computer program product and a computer program distribution medium according to the appended independent claims.

BACKGROUND

When a mobile station is switched on, it first scans the radio interface in order to detect the presence of a network. After it receives a signal from a base station, the mobile station implements a location update, and thereby informs the network of its location and identity. After these operations, the mobile station may initiate a radio resource session by requesting channel access. A channel refers herein to means of unidirectional transmission of information between at least two endpoints, herein a mobile station and a base station.

Access may be triggered in response to a communication need originating from the mobile station (a mobile originated call, location updating), or from the infrastructure side (mobile terminating call). Either way, the mobile station initiates the access procedures by sending an access request message to the base station. The base station decodes the received access request message, and after a successful decoding, forwards the access request to the network and thereby initiates a channel access procedure. The procedure comprises choosing of a free traffic channel, activating this channel in the base station and sending an assignment message to the mobile station. Once the mobile station has received the assignment message, it modifies its reception and transmission configuration to adapt to the frequency and time characteristics of the new channel, and starts establishing a link layer connection for signalling messages related to the original communication need.

The radio interface is a complex environment and provides various sources of interference, for example thermodynamic type of noise, and band noise from network or environment. Occasionally, the base station may misinterpret an invalid access request as a genuine one, and initiate unnecessarily the channel assignment procedure. Misinterpretation of bursts is also probable when mobile station at the limit of its sensitivity.

Such invalid channel access requests do not lead to a successful channel assignment establishment, and they should, in principle, be detected as early as possible, preferably already at the base station. It is clear that the processing of invalid channel access requests waste channel capacity, and thus degrade the network performance. However, from an operator's perspective, an even more disadvantageous effect is that the unsuccessful channel assignment procedures due to the undetected invalid channel access requests will show in Key Performance Indicator (KPI) figures of the operator as a failed call set-up. Since the KPI is an important driver of operator's actions, this may lead to unnecessary network optimization, testing and hours wasted in problem solving. In the worst case, the problem may degrade the accuracy of network coverage dimensioning.

Base transceiver stations may have internal design requirements that allow only a given number of invalid channel access requests in a certain period of time. Therefore detections made by the BTS should be as effective as possible. On the other hand, if the filtering of invalid channel access requests is too strict, genuine channel access requests may be inadvertently rejected, which degrades the receiver performance. Consequently, extreme care is required when measures for detecting and filtering out invalid channel access requests are designed.

A prior art method of detecting invalid channel access requests, known from networks implementing Global System for Mobile Communications (GSM), uses a two-staged procedure, which is based on determinations of two parameters:

1. Energy of estimated impulse response taps, where indications for channel access requests with inappropriate energies are filtered out. This stage aims to ensure that pure noise is not entered into the system.
2. Signal-to-noise ratio (SNR), where indications for channel access requests whose SNR does not exceed the threshold are filtered out. SNR plays a dominant role in detection of invalid channel access requests.

The procedures after the time the channel access request arrives at the base station and before the indication of the channel access request from the base station are herein referred to as receiver pre-processing. The procedures of receiver pre-processing may comprise, for example, timing offset correction, whitening, noise estimates, automatic frequency correction, etc. Depending on the implementation, the detection of invalid channel access requests is integrated to the pre-processing procedure. Presently, the problem with the current solution is that determination of SNR is measured at a defined stage of the receiver pre-processing and therefore some of the preceding functions, like the noise whitening, may affect the levels of the measured SNR.

A new SNR threshold are typically derived as a result of extensive simulations and analyses of measurement data collected by means of an actual product, which involves considerable amount of research and development (R&D) resources. However, due to varying customer needs or R&D specifications, the enhancements and alterations to the receiver features are unavoidable. For example, compensation of link imbalances and performance issues associated with new mobile station features typically require receiver improvements. Due to this interdependency between detection of invalid channel access requests and the pre-processing procedure, laborious adjustments are evident after any minor changes in the receiver configuration. This significantly reduces the flexibility of design and increases the R&D effort associated with releasing new products, both mobile stations and base station elements, to the market.

BRIEF DESCRIPTION OF THE INVENTION

An object of the present invention is thus to provide an improved solution for detection of invalid channel access requests. The objects of the invention are achieved by a data transmission method, a network element, a detection unit, a telecommunication system, a computer program product and a computer program distribution medium, which are characterized by what is stated in the independent claims. The preferred embodiments of the invention are disclosed in the dependent claims.

An advantage of the invention is that it creates more freedom for receiver design and, by reducing the testing effort, improves the release of new products into the market.

This is performed by eliminating the interdependency between detection of invalid channel access requests and receiver configuration.

LIST OF DRAWINGS

In the following, the invention will be described in greater detail with reference to the embodiments and the accompanying drawings, in which FIG. 1 illustrates a simplified block diagram of a GSM mobile communication system;

Figure 6:
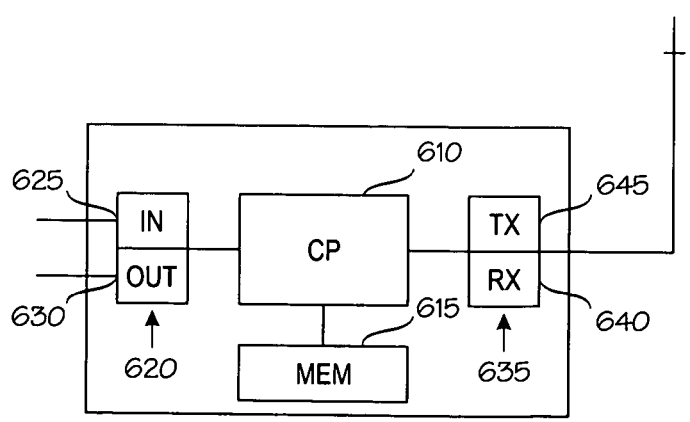

FIG. 6 comprises a functional description of a base station according to the present embodiment.

DESCRIPTION OF EMBODIMENTS

The invention is applicable to mobile communication systems where a radio resource session involves a channel access request received from a mobile station over the air interface. Mobile communications system 10 refers generally to any telecommunications system wherein the access point (essentially wireless access) to the system may change when users are moving within the service area of the system. A typical mobile communications system that comprises a Public Land Mobile Network (PLMN) and one or more mobile stations (MS). Often the mobile communications network is an access network providing a user with a wireless access to external networks, hosts, or services offered by specific service providers. In the following, the invention will be described using the terms and elements of the GSM mobile communications system (Global System for Mobile Communications, GSM), but the invention may be applied in connection of any other cellular mobile communications system wherein channel access requests are utilized in channel assignments. Such systems include third-generation mobile communication systems, such as the Universal Mobile Telecommunications System (UMTS), and mobile communication systems corresponding to the global GSM system (Global System for Mobile Communications), such as GSM 1800 and PCS (Personal Communications System), and systems based on the above systems, such as GSM 2+ systems. Services of the GSM 2+ stage include GPRS (General Packet Radio Service) and CAMEL (Customised Applications for Mobile network Enhanced Logic).

Figure 1:
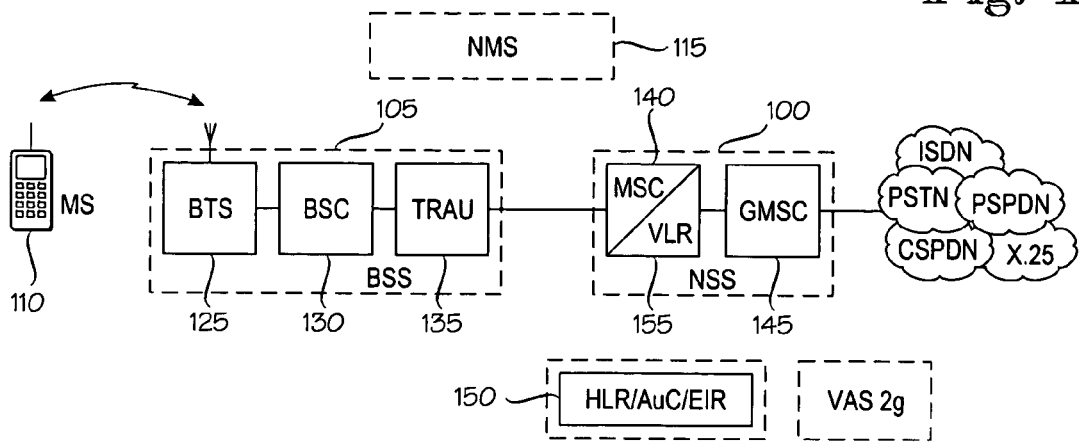

FIG. 1 in the attached drawings illustrates a simplified block diagram of a GSM mobile communication system. The figure shows only the elements necessary for illustrating the invention but for a person skilled in the art it is self-evident to that a mobile communication system also comprises other prior art functions and structures that need not be described here. The mobile communication system comprises four parts: a network subsystem (NSS) 100, a base station system (BSS) 105, a mobile station (MS) 110, and a network management system (NMS) 115. For implementing value added services, a value added service platform (VAS2 g) 120 is typically attached to the mobile communication system. Value added services generally refer to services employing standardized interfaces towards the GSM network. The VAS2 g most often includes at least a short message centre and voice message service.

The mobile station 110 is connected to a base transceiver station (BTS) 125 via a radio path. The base station system 105 consists of a base station controller (BSC) 130 and base stations 125 under it, and a transcoding and rate adaptation unit (TRAU) 135. The mobile services switching centre (MSC) 140 usually has a plurality of base station controllers 130 operating under it. The mobile services switching centre 140 communicates with other mobile services switching centres and a gateway mobile services switching centre (GMSC) 145. The GSM network typically accesses also other networks, such as a public switched telephone network PSTN, another mobile communication network PLMN, or an ISDN network ISDN, via the gateway mobile services switching centre (GMSC) 145. The network management system 115 is responsible for monitoring and controlling system resources and storing data on their use and operation in the entire system. The standardized interface between the base station system 105 and the network subsystem 100 is called an A interface and the one between the mobile station and the base station system is called a Um interface.

The subscriber data of the mobile station 110 are stored permanently in the system's home location register (HLR) 150 and temporarily in the visitor location register (VLR) 155 according to the location of the mobile station 110 at a given time. Information on the visitor location register 155 that maintains the subscriber data of the mobile station 110 at a given time is transmitted to the home location register 150. The network subsystem typically also comprises an authentication centre (AuC) for maintaining data required to identify a subscriber and an equipment identity register (EIR) for maintaining equipment identification data.

In GSM, a random access channel (RACH) is a contention access uplink channel that can be used by a mobile station to signal a number of defined messages, for example capacity request messages and access request messages. The RACH is mapped to the physical random access channel (PRACH). RACH may be used in the uplink to request allocation of a SDCCH (standalone dedicated control channel), a logical channel on the radio interface that is used for sending short messages, and during connection setup used for identification and authentication procedures and for starting the ciphering. Packet random access channel (PRACH, CPRACH) is an uplink logical channel that the mobile stations may use for requesting allocation of one or several PDTCHs (packet data traffic channel) for uplink or downlink direction.

As soon as a RACH burst has been received, the BTS (base transceiver station) starts decoding a channel request message and passes information to BSC for allocating radio resources for call establishment. In GSM, the invalid RACH bursts are called as RACH ghosts, which do not lead to a useful benefit of SDCCH establishment. A network cannot differentiate between a true channel access request and a RACH ghost, and therefore channel allocation process will be unnecessarily started if a RACH ghost goes undetected. Thus, the RACH ghosts need to be identified at BTS level so that as few RACH ghosts as possible enter the network infrastructure and initiate resource allocation procedures.

Base transceiver stations typically have internal design requirements that allow only a given number of RACH ghosts for a certain period of time; for example, a maximum of 10 RACH ghosts may be allowed within 24 hours for a BTS. To meet such requirements, detections of RACH ghosts should be very strict. However, if the RACH ghost filtering is too strict, it may end up rejecting genuine channel access requests, which in turn may degrade the original receiver performance. Thus, extreme care is to be followed in designing RACH ghost filters for the base stations.

Figure 2:
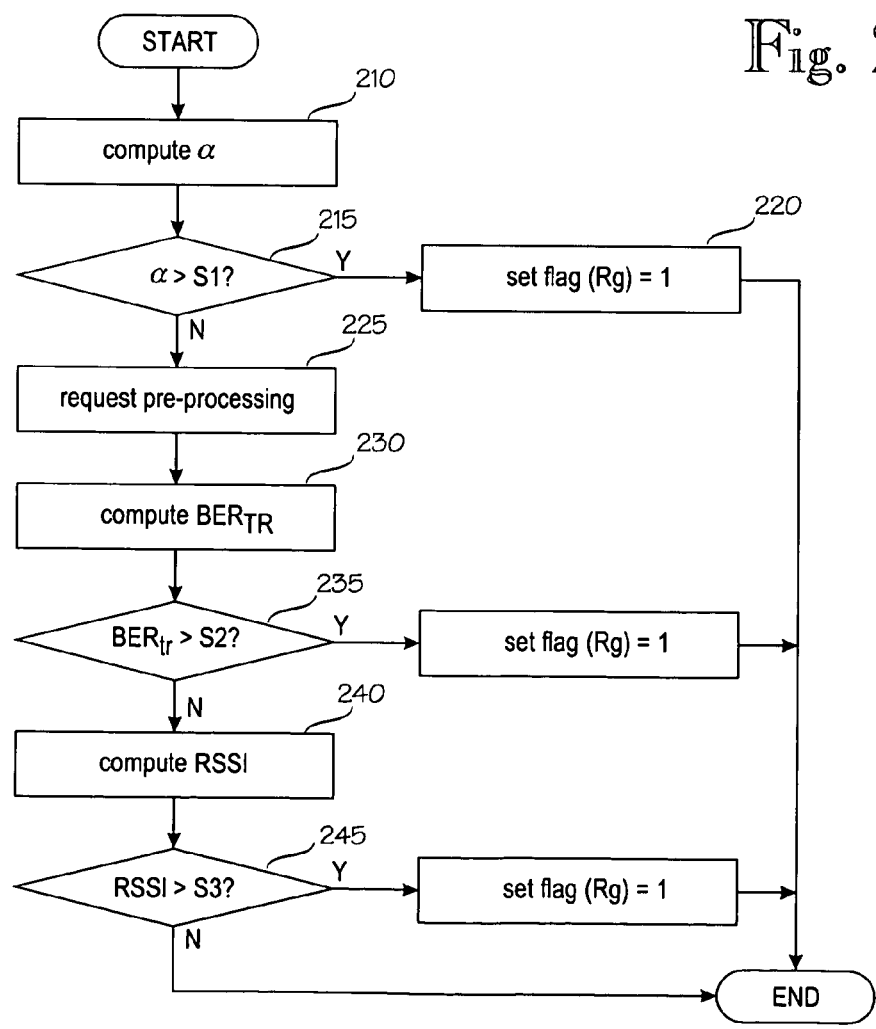
FIG. 2 shows a flow chart illustrating an embodiment of the invented method.

The flow chart of FIG. 2 illustrates an embodiment of the invented method, wherein the solution is applied to the detection of RACH ghosts in a BTS of a GSM system. According to the invention, the validity of the preprocessed channel access request is evaluated on the basis of a detection rule that is not dependent on the configuration of the radio receiving unit.

Step 210 illustrates a stage for identifying bursts caused by background noise. In step 210, the background noise information is determined by computing a predefined number of impulse response taps, and generating a ratio of the average energy of a group of selected impulse response taps, and the average energy of a group of remaining impulse response taps. This ratio is compared to a predefined first threshold (step 215), and if the first threshold is exceeded, the channel access request is considered to be background noise, and filtered out. In the present embodiment, the BTS receiver initially computes from the received channel access request 73 taps and selects thereof a group of 5 taps that contribute the highest energy. The reason for using 73 taps is that this amount allows the BTS receiver up to 68 symbol periods to track the timing offset. In practise this means that the BTS is able to synchronise with a mobile within a distance of 35 km.

Let us assume that the receiver selects the following tap group for equalisation $$h_s = h_5, h_6, h_7, h_8, h_9 \quad (1)$$

wherein the initial set is $$h_i = h_0, h_1, \ldots, h_{72} \quad (2)$$

$h_s$ represents the selected channel tap vector, whereas $h_i$ denotes the initial vector. These taps are complex. A decision criteria is formed according to $$\alpha = \frac{e_s}{e_r} \quad (3)$$

where $e_s$ represents the average energy of the selected taps $$e_s = \frac{1}{5} \sum_{k=0}^{k=5-1} |h_{k+5}|^2 \quad (4)$$

and $e_r$ represents the average energy of the rejected taps, i.e.

$$e_r = e_t - e_s \quad (5)$$

where $e_t$ represents the average energy of the total impulse response (i.e. energy of the initial group)

$$e_t = \frac{1}{73} \sum_{k=0}^{k=73-1} |h_k|^2 \quad (6)$$

A RACH ghost is reported if the $\alpha > s1$.

Figure 3:
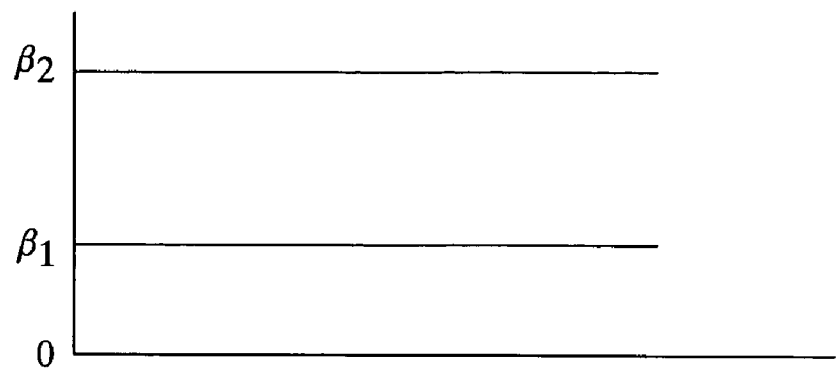
FIG. 3 shows a flow chart illustrating a definition of a first threshold.

The flow chart of FIG. 3 illustrates the definition of the first threshold s1 associated with the detection rule of step 215. According Gaussian theory, minimum threshold for filtering out pure noise is at $\beta 1 = 1$. For white noise sequence, the auto correlation coefficients (taps) tend to be flat for all lag variables.

$\beta_1$ represents a lower threshold, which may be used to filter out pure noise. On the other hand, $\beta_1$ is not high enough to appropriately block invalid channel access requests from entering into the system. In other words, use of $\beta_1$ can provide for the Rx performance requirements, but significant amount of RACH ghosts will also enter the system. Even though filtering of background noise is one of the preliminary steps, it is important that the amount of passed RACH ghosts is low so that processing burden of the next detection stages remains reasonable.

If s1 is set higher than $\beta 1$, pure noise can be suppressed almost completely, but an amount of invalid channel access requests will still be forwarded to the next stage. $\beta_2$ represents a higher threshold where ghost RACH filtering is efficient, but where the degradation of bit error rate (BER) has not yet started. The degradation of BER follows from some actually valid channel access requests being rejected, instead of being forwarded for channel assignment procedure. S1 may be set close to $\beta 2$ experimentally. For a given Eb/No, where Eb corresponds to the energy per bit and No corresponds to the noise spectral density, the first threshold is initially set to $\beta 1$. A number of valid channel access requests are sent and BER=$\epsilon$ is measured at the lower limit $\beta 1$. The first threshold is increased until the bit error rate $p_e$ begins to increase due to true channel access requests being blocked from entering the system:

$$p_e(\beta > \beta_2) > \epsilon \quad (7)$$

The value where this increase is detected is set as the first threshold, i.e. s1~$\beta_2$.

Referring to FIG. 2, if ratio of the average energy of a group of selected impulse response taps, and the average energy of a group of remaining impulse response taps exceeds the first threshold s1 (step 215), a RACH ghost flag is set to 1 (step 220), and processing of the channel access request is terminated without initiating a channel assignment procedure.

Step 225 illustrates the general algorithms that are configured to BTS for performing preliminary operations on the channel access request before forwarding the information on the received channel access request in a CHANNEL REQUIRED-message to BSC. In the context of the present embodiment, these algorithms do not comprise functions for rejecting invalid channel access requests, but are focused on operations related to timing offset correction, whitening, noise estimates, automatic frequency correction, etc. For a person skilled in the art, it is clear that actual receivers may comprise further processing and/or pre-processing algorithms that are not relevant for described functions for rejecting invalid channel access requests, also in other phases of the procedure of FIG. 2.

Figure 4:
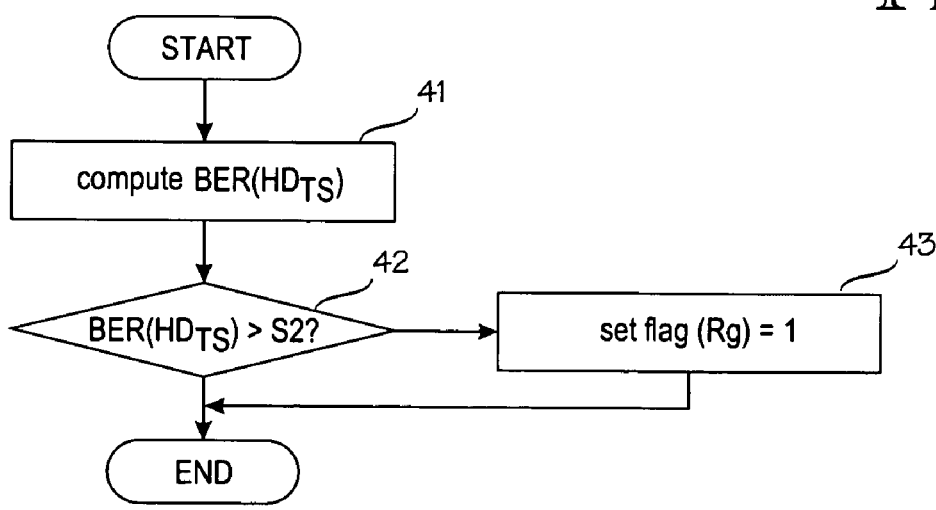
FIG. 4 shows a flow chart illustrating a step of RACH ghost detection using training sequence BER.

Step 230 illustrates a step of RACH ghost detection using training sequence BER. This step is illustrated in more detail in the flow chart of FIG. 4. In step 41, the training sequence BER is determined by computing a hard decision of the training sequence soft values. Step 42 illustrates the detection rule of step 230, wherein the determined training sequence BER is compared against a predefined second threshold s2. If the threshold s2 is exceeded (step 43, step 235), the channel access request is considered invalid, and a RACH ghost flag is set to 1 (step 44, step 240), and processing of the channel access request is terminated without initiating a channel assignment procedure. Otherwise the processing of the channel access request in the receiver will continue normally.

In the present embodiment, the threshold s2 is set to 7. This value is obtained by analysing the theoretical BER limit of GMSK modulated signal at around receiver noise floor, i.e. Eb/No=0 dB. The theoretical expectation of BER for GMSK modulated signal can be given by:

$$BER = 0.5\left(1 - \text{erf}\left(\sqrt{10^{\frac{EbNo}{10}} - 0.5}\right)\right) \quad (8)$$

where erf represents the error function. The error function erf(x) is twice the integral of the Gaussian distribution with 0 mean and variance of 0.5.

$$\text{erf}(x) = \frac{1}{\sqrt{\pi}} \int_0^x e^{-t^2} \, dt \quad (9)$$

where $$x = \sqrt{10^{\frac{EbNo}{10}} - 0.5} \quad (10)$$

Figure 5:
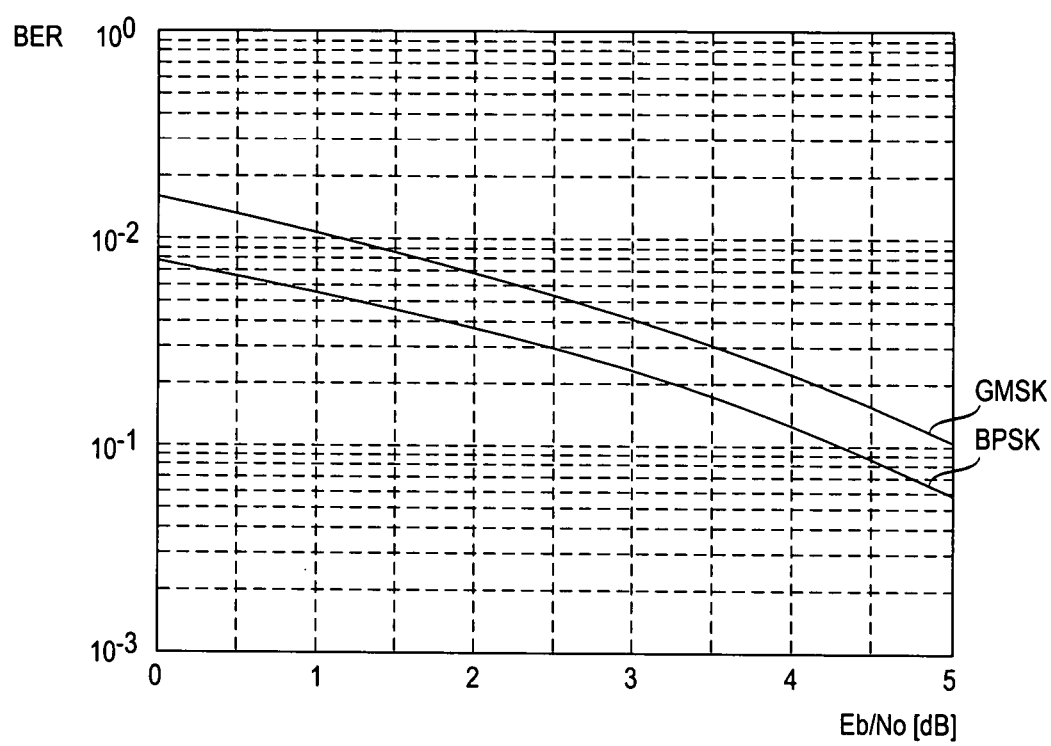
FIG. 5 illustrates a comparison of the theoretical BER limits of GMSK and BPSK.

FIG. 5 illustrates a comparison of the theoretical BER limits of GMSK and BPSK. Based on the curves, Eb/No=0 dB, the BER of GMSK is 0.16. In the present embodiment, where 41 represents the total number of bits in a RACH training sequence, this corresponds to ratio 7/41, and threshold s2 may be set to 7. This threshold represents theoretical limit, which is not dependent on the configuration of the radio receiving unit. In other words this means that no modifications to the threshold s2 are necessary if, for example, a modification is made in the receiver pre-processing.

In the stage of step 220, the equalized soft values are compared against the transmitted bits. In challenging transmission conditions, for example when the RX level is low, the noise and interference begins to dominate and which may cause unpredictable bit patterns. At the worst, training sequence hard-decisions can become similar to the transmitted bits. Step 240 illustrates a further step of RACH ghost detection using receiver signal strength indicator (RSSI).

The detection rule associated with this stage is based on RSSI. The BTS receiver calculates the received signal power for every burst. The signal power is computed from the received Q samples, which are passed through a low pass filter. The low pass filter is employed in order to remove adjacent channel interference. The signal power is derived from:

$$p_s = 10\log\left(\frac{1}{N}\sum_{n=0}^{n=N-1} |I_n|^2 + |Q_n|^2\right) - 30 \, \text{dBm} \quad (11)$$

The Received Signal Strength Indicator (RSSI) represents the difference between the received signal power $p_r$ and a reference value $p_s$. i.e.

$$RSSI = p_r - p_s \, \text{dB} \quad (12)$$

With the reference power of −110 dBm, and under normal operating conditions, the RSSI is typically well above 0 dB.

In the present embodiment, the detection rule comprises comparing the RSSI of the received channel access request and comparing it against a predefined third threshold s3=0 (step 245). If the RSSI exceeds the third threshold s3, a RACH ghost flag is set to 1 (step 250), and processing of the channel access request is terminated without initiating a channel assignment procedure. Otherwise the processing of the channel access request in the receiver will continue normally.

By maintaining the reference power constant, regardless of receiver sensitivity, the detection threshold of this stage remains independent of RX performance changes that come from modifications to the receiver configuration. If, for some reason, the reference power should be aligned with the receiver sensitivity level ($p_s$ should be set to correspond with the receiver sensitivity), any sensitivity improvement may be simply added to the existing threshold, i.e. no additional R&D effort is needed to tune the threshold.

In the present embodiment, the invented solution improves the performance of RACH ghost detection in the receiver. Where a conventional method in a defined BTS test setup showed 108 RACH ghosts from 3 transceivers within a period of 111 hours, with the new solution the number of reported RACH ghosts reduced to 1 for the same test setup. The invented solution eliminates the interdependency between Ghost RACH tuning and RX performance and therefore creates more freedom for receiver (pre-processing technology) development. This flexibility optimises RACH processing in the receiver, which has a positive impact in saving DSP cycle.

The conventional method utilizes a predefined hard-coded SNR threshold. This threshold is tuned interactively with RACH ghost detection and RX Sensitivity performance, and will always be a compromise. While the new solution is independent of the receiver configuration, the RX performance may actually be improved in certain areas (for example in typical urban environment, TU). By means of the optimised succession of stages, the new solution enables reduction of the time for call set-up processing (channel request). Early filtering of RACH ghosts also eliminates unnecessary allocation of valuable spectrum.

The implementation of the described solution is illustrated by referring to FIG. 6 that comprises a functional description of a base station according to the present embodiment. The base station comprises processing means 610, an element that comprises an arithmetic logic unit, a number of special registers and control circuits. Connected to the processing means are memory means 615, a data medium where computer-readable data or programs or user data can be stored. The memory means typically comprise memory units that allow both reading and writing (RAM), and a memory whose contents can only be read (ROM). The base station also comprises an interface block 620 with input means 625 for inputting data from the network infrastructure (basically the BSC), for internal processing in the base station, and output means 630 for outputting data from the internal processes of the base station to the network infrastructure. Examples of said input means comprise network interfaces, generally known to a person skilled in the art. The base station also comprises a transceiver block 635 configured with receiving means 640 for receiving information from the air interface and for inputting the received information to the processing means 610, as well as with transmitting means 645 for receiving information from the processing means 610, and processing it for sending via the air interface. The implementation of such a transceiver unit is generally known to a person skilled in the art. The processing means 610, memory means 615, interface block 620, the interface block 620, and the transceiver unit 635 are electrically interconnected for performing systematic execution of operations on the received and/or stored data according to predefined, essentially programmed processes of the unit. In a solution according to the invention, the operations comprise the functionality of the receiver unit of the base station BTS as described above.

Even though the invention is described above with reference to an example according to the accompanying drawings, it is clear that the invention is not restricted thereto but it can be modified in several ways within the scope of the appended claims.

The invention claimed is:

1. A channel allocation method for use in a telecommunication system, the method comprising:
    receiving a channel access request to a radio receiving unit from a mobile station of a telecommunication system;
    performing a preprocessing operation on the channel access request using a predefined configuration of devices and algorithms of the radio receiving unit;
    computing, during the preprocessing operation, one or more characteristics of the channel access request;
    filtering background noise from the channel access request;
    comparing the one or more computed characteristics of the channel access request against corresponding one or more detection rules, wherein each of the detection rules is independent of said configuration of the radio receiving unit;
    considering the channel access request valid in response to each of the computed characteristics of the channel access request fulfilling the corresponding detection rule; and
    outputting the channel access request for channel allocation in response to the channel access request being considered valid.

2. The method of claim 1, wherein
    the computing comprises computing a bit error rate of a training sequence by computing a hard decision of soft values of the training sequence,
    the comparing comprises comparing the bit error rate of the training sequence to a threshold that corresponds to a theoretical bit error rate limit of gaussian minimum shift keying where energy per bit to noise density ratio equals zero, and
    the considering comprises considering the channel access request fulfilling the detection rule when the threshold is not exceeded.

3. The method of claim 1, wherein
    the computing comprises computing a received signal strength indication of the channel access request,
    the comparing comprises comparing the received signal strength indication of the channel access request against a predefined threshold, and
    the considering comprises considering the channel access request fulfilling the detection rule when the threshold is not exceeded.

4. The method of claim 1, wherein
    the computing comprises computing a bit error rate of a training sequence by computing a hard decision of soft values of the training sequence and a received signal strength indication of the channel access request;
    the comparing comprises comparing the bit error rate of the training sequence to a first threshold that corresponds to a theoretical bit error rate limit of gaussian minimum shift keying, where energy per bit to noise density ratio equals zero, and
    comparing the received signal strength indication of the channel access request against a predefined second threshold, and
    the considering comprises considering the channel access request as fulfilling the detection rule when the first threshold and the second threshold is not exceeded.

5. A network element, comprising:
    a radio receiving unit configured to receive a channel access request from a mobile station of the telecommunication system, said radio receiving unit comprising
        a predefined configuration of devices and algorithms to perform pre-processing operations on the channel access request;
        a background noise filtering function unit;
        a detection function unit configured to
            compute, during the preprocessing operation, one or more characteristics of the channel access request,
            compare the one or more computed characteristics of the channel access request against corresponding one or more-detection rules, wherein each of the detection rules is independent of said configuration of the radio receiving unit, and
            consider a channel access request valid in response to each of the computed characteristics of the channel access request fulfilling the corresponding detection rule; and
        an output unit configured to output the channel access request for channel allocation in response to the channel access request being considered valid.

6. The network element of claim 5, wherein the computed characteristic of the channel access request is configured to correspond to a bit error rate of a training sequence determined by computing a hard decision of soft values of the training sequence, and the detection rule comprises a comparison of the hard decision to a theoretical bit error rate limit of gaussian minimum shift keying, where energy per bit to noise density ratio equals zero.

7. The network element of claim 5, wherein the computed characteristic of the channel access request is configured to corresponds to a received signal strength indication of the channel access request, and the detection rule comprises a comparison of the received signal strength indication against a predefined threshold.

8. The network element of claim 5, wherein the detection unit is configured to
    determine a first characteristic of the channel access request that corresponds to a bit error rate of a training sequence determined by computing a hard decision of soft values of the training sequence, and a first detection rule comprises a comparison of the hard decision to a theoretical bit error rate limit of gaussian minimum shift keying, where energy per bit to noise density ratio equals zero; and
    determine a second characteristic of the channel access request that corresponds to a received signal strength indication of the received channel access request, and a second detection rule comprises a comparison of the received signal strength indication against a predefined threshold.

9. A detection unit, comprising:
    connection means for connecting to a radio receiving unit of a network element of a telecommunication system, said radio receiving unit comprising a predefined configuration of devices and algorithms for performing pre-processing operations on bursts received from mobile stations, wherein said detection unit is configured to input from the radio receiving unit a channel access request of a mobile station; compute one or more characteristics of the channel access request; filtering background noise from the channel access request; compare the one or more computed characteristics of the channel access request against corresponding one or more detection rules, wherein each of the detection rules is independent of said configuration of the radio receiving unit, consider a channel access request valid in response to each of the computed characteristics of the channel access request fulfilling the corresponding detection rule, and output the channel access request for channel allocation in response to the channel access request being considered valid.

10. The detection unit of claim 9, wherein the characteristic of the channel access request corresponds to a bit error rate of a training sequence determined by computing a hard decision of soft values of the training sequence, and the detection rule comprises a comparison of the hard decision to a theoretical bit error rate limit of gaussian minimum shift keying, where energy per bit to noise density ratio equals zero.

11. The detection unit of claim 9, wherein the characteristic of the channel access request corresponds to a received signal strength indication of the received channel access request, and the detection rule comprises a comparison of the received signal strength indication against a predefined threshold.

12. The detection unit of claim 9, wherein the detection unit is configured to
  obtain a first characteristic of the channel access request that corresponds to bit error rate of a training sequence determined by computing a hard decision of soft values of the training sequence and a first detection rule comprises a comparison of the hard decision to a theoretical bit error rate limit of gaussian minimum shift keying, where energy per bit to noise density ratio equals zero; and
  obtain a second characteristic of the channel access request that corresponds to a received signal strength indication of the received channel access request, and the second detection rule comprises a comparison of the received signal strength indication against a predefined threshold.

13. A telecommunication system, comprising:
  a mobile station; and
  a network element comprising
    a radio receiving unit configured to receive a channel access request from a mobile station of the telecommunication system, said radio receiving unit comprising
      a predefined configuration of devices and algorithms to perform pre-processing operations on the channel access request;
    a background noise filtering function unit;
    a detection function unit configured to
      compute, during the preprocessing operation, one or more characteristics of the channel access request,
      compare the one or more computed characteristics of the channel access request against corresponding one or more detection rules, wherein each of the detection rules is independent of said configuration of the radio receiving unit, and
      consider a channel access request valid in response to each of the computed characteristics of the channel access request fulfilling the corresponding detection rule; and
    an output unit configured to output the channel access request for channel allocation in response to the channel access request being considered valid,
  wherein the computed characteristic of the channel access request is configured to correspond to a bit error rate of a training sequence determined by computing a hard decision of soft values of the training sequence, and the detection rule comprises a comparison of the hard decision to a theoretical bit error rate limit of gaussian minimum shift keying, where energy per bit to noise density ratio equals zero.

14. A computer program product encoding a computer program of instructions for executing a computer process for detection of invalid channel access requests, the computer process comprising:
  receiving a channel access request to a radio receiving unit from a mobile station of a telecommunication system;
  performing a pre-processing operation on the channel access request using a predefined configuration of devices and algorithms of the radio receiving unit;
  filtering background noise from the channel access request;
  computing, during the preprocessing operation, one or more characteristics of the channel access request;
  comparing the one or more computed characteristics of the channel access request against corresponding one or more detection rules, wherein each of the detection rules is independent of said configuration of the radio receiving unit;
  considering the channel access request valid in response to each of the computed characteristics of the channel access request fulfilling the corresponding detection rule; and
  outputting the channel access request for channel allocation in response to the channel access request being considered valid.

* * * * *